(12) United States Patent
Alvarez Valenzuela et al.

(10) Patent No.: US 10,432,109 B2
(45) Date of Patent: Oct. 1, 2019

(54) MODULAR MULTILEVEL CONVERTER

(71) Applicant: SIEMENS AKTIENGESELLSCHAFT, Munich (DE)

(72) Inventors: Rodrigo Alonso Alvarez Valenzuela, Nuremberg (DE); Joerg Dorn, Buttenheim (DE); Dominik Ergin, Baiersdorf (DE); Herbert Gambach, Uttenreuth (DE); Wolfgang Goblirsch, Tuchenbach (DE); Joerg Lang, Stadtsteinach (DE); Martin Pieschel, Nuremberg (DE); Frank Schremmer, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/070,157

(22) PCT Filed: Jan. 19, 2016

(86) PCT No.: PCT/EP2016/050960
§ 371 (c)(1),
(2) Date: Jul. 13, 2018

(87) PCT Pub. No.: WO2017/125134
PCT Pub. Date: Jul. 27, 2017

(65) Prior Publication Data
US 2019/0028038 A1    Jan. 24, 2019

(51) Int. Cl.
*H04B 10/00* (2013.01)
*H02M 7/483* (2007.01)
(Continued)

(52) U.S. Cl.
CPC ......... *H02M 7/483* (2013.01); *H02M 7/5387* (2013.01); *H04B 10/50* (2013.01);
(Continued)

(58) Field of Classification Search
CPC .... H04B 10/032; H04B 10/272; H04B 10/50; H04B 10/0793; G02B 6/43;
(Continued)

(56) References Cited

U.S. PATENT DOCUMENTS 6,404,143 B1 * 6/2002 Pilz ........................ H05B 37/02
315/155
6,980,091 B2 * 12/2005 White, II ................. H04B 3/56
333/24 R
(Continued)

FOREIGN PATENT DOCUMENTS

DE    102005041087 A1    3/2007
EP          2549634 A1 *  1/2013    .............. H02M 7/49
(Continued)

*Primary Examiner* — Hibret A Woldekidan
(74) *Attorney, Agent, or Firm* — Laurence Greenberg; Werner Stemer; Ralph Locher

(57) ABSTRACT

A modular multilevel converter includes a plurality of sub-modules. Each of the sub modules has at least two electronic switching elements, an electrical energy storage device, two galvanic power terminals, an optical communication input (222) and an optical communication output. A plurality of the sub-modules is connected to a series circuit by way of their communication input and communication output.

16 Claims, 5 Drawing Sheets

(51) Int. Cl.
    H02M 7/5387     (2007.01)
    H04B 10/50      (2013.01)
    H02M 1/084          (2006.01)
    H02J 3/36           (2006.01)
    H02M 1/00           (2006.01)

(52) U.S. Cl.
    CPC ............... *H02J 3/36* (2013.01); *H02M 1/084* (2013.01); *H02M 2001/0003* (2013.01); *H02M 2007/4835* (2013.01); *Y02E 60/60* (2013.01)

(58) Field of Classification Search
    CPC ......... H04J 14/0291; H04Q 2011/0081; H04Q 11/0005; H04Q 2011/0052; H04Q 2011/0092; H02M 7/483; H02M 7/5387; H02M 1/084; H02M 2001/0003; H02M 2007/4835; H02M 2001/0077; H02J 3/36; Y02E 60/60
    USPC ....................... 398/115–117, 5, 164
    See application file for complete search history.

(56) References Cited

U.S. PATENT DOCUMENTS

| | | | |
|---|---|---|---|
| 8,183,874 B2 * | 5/2012 | Dommaschk | H02M 7/483 324/658 |
| 8,704,498 B2 * | 4/2014 | Trainer | H02M 7/483 323/207 |
| 8,792,261 B2 * | 7/2014 | Inoue | H02M 7/217 363/129 |
| 9,099,914 B2 * | 8/2015 | Wissner | H02M 7/003 |
| 9,190,932 B2 * | 11/2015 | Harnefors | H02J 3/1814 |
| 9,214,871 B2 * | 12/2015 | Tsuchiya | H02M 7/49 |
| 9,853,537 B2 * | 12/2017 | Mueller | H02M 1/36 |
| 9,917,534 B2 * | 3/2018 | Inoue | H02M 7/217 |
| 9,929,633 B2 * | 3/2018 | Couch | H02M 7/483 |
| 10,181,802 B2 * | 1/2019 | Dommaschk | H02M 7/483 |
| 2002/0186429 A1 * | 12/2002 | Kaspit | H04J 14/0283 14/283 |
| 2008/0198630 A1 | 8/2008 | Hiller | |
| 2012/0195548 A1 * | 8/2012 | Brunner | G02B 6/43 385/18 |
| 2017/0005472 A1 * | 1/2017 | Son | H02J 3/36 |
| 2019/0044620 A1 * | 2/2019 | Alvarez Valenzuela | G08C 23/06 |

FOREIGN PATENT DOCUMENTS

| | | | |
|---|---|---|---|
| EP | 2549634 A1 | 1/2013 | |
| EP | 2905889 A1 * | 8/2015 | ............ H02M 7/483 |
| EP | 2905889 A1 | 8/2015 | |
| WO | 2011120572 A1 | 10/2011 | |
| WO | 2013178249 A1 | 12/2013 | |

* cited by examiner

MODULAR MULTILEVEL CONVERTER

BACKGROUND OF THE INVENTION

Field of the Invention

The invention relates to a modular multilevel converter having a multiplicity of submodules that each have at least two electronic switching elements and an electrical energy store.

Converters are power electronics circuits for converting electrical energy. Converters can be used to convert alternating current into direct current, direct current into alternating current, alternating current into alternating current of a different frequency and/or amplitude or direct current into direct current of a different voltage. Converters can have a multiplicity of modules of the same kind (what are known as submodules) that are electrically connected in series. Each of these submodules has at least two electronic switching elements and an electrical energy store. Such converters are referred to as modular multilevel converters. The electrical series connection of the submodules allows high output voltages to be achieved. The converters are easily adaptable (scalable) to suit different voltages, and a desired output voltage can be produced relatively accurately. Modular multilevel converters are often used in the high-voltage domain, for example as converters in high-voltage DC transmission installations or as power factor correctors in flexible three-phase transmission systems.

To actuate the electronic switching elements contained in the submodules and to report back states of the submodules (for example to report back the state of charge of the energy store of the submodule), messages are exchanged between a central control device and the submodules. For reasons of simple and inexpensive implementability, it is desirable to arrange the control device at ground potential, whereas the individual submodules may be at different voltage potentials (including at high-voltage potentials, inter alia). Thus, the message transmission to the submodules is effected by means of optical fibers.

In this case, it is conceivable for an optical fiber to be laid from the central control device to each submodule (in order to transmit messages from the control device to the submodule) and for a further optical fiber to be laid from the submodule to the control device (in order to transmit messages from the submodule to the control device). This solution thus requires two optical fibers per submodule, said optical fibers extending from the submodule to the control device. Since the control device may be at a considerable distance from the respective submodule (for example such distances may be 100 m or more), substantial lengths of optical fibers are needed and considerable costs are incurred for these optical fibers and for laying them.

SUMMARY OF THE INVENTION

The invention is based on the object of specifying a converter and a method that allow the transmission of messages to the submodules to be realized inexpensively.

This object is achieved according to the invention by a converter and by a method as claimed in the independent patent claims. Advantageous embodiments of the converter and of the method are specified in the respective dependent patent claims.

The disclosure relates to a modular multilevel converter having submodules that each have at least two electronic (in particular power electronic) switching elements, an electrical energy store, two electrical connections, an optical communication input and an optical communication output, wherein a plurality of the submodules are connected by means of their communication input and their communication output (in terms of communication) to form a series circuit (that is to say are connected in series). In this case, it is particularly advantageous that the plurality of the submodules form a series circuit (in terms of communication). In other words, the optical communication output of a submodule is thus connected to the optical communication input of the adjacent submodule of the series circuit. The optical communication output of the adjacent submodule is connected to the optical communication input of the next submodule of the series circuit, and so on. In this case, it is advantageous that each submodule of the series circuit can use its optical communication output to transmit messages, in particular telegram messages, to the adjacent submodule of the series circuit. This results in (physically) short communication paths from one submodule of the series circuit to the adjacent submodule of the series circuit.

The modular multilevel converter may be designed such that the first submodule of the series circuit and the last submodule of the series circuit are each connected to a communication device allocated to the series circuit. As a result, the communication device can communicate with all submodules of the series circuit.

The modular multilevel converter may be designed such that the submodules of the series circuit and the communication device allocated to the series circuit form a ring structure. This ensures that firstly the communication device can send messages to all submodules of the series circuit, and that secondly all submodules of the series circuit can also send messages to the communication device.

The modular multilevel converter may also be designed such that the communication device is a master and each of the submodules of the series circuit is a slave. This advantageously allows the communication device to control and supervise the communication with the sub modules configured as slaves.

The modular multilevel converter may also be designed such that at least one submodule (of the series circuit) has an optical bypass device (optical bypass) (wherein the bypass device optically bypasses the submodule at least intermittently). In particular, the modular multilevel converter may also be designed such that each of the submodules has an optical bypass device. In particular, the bypass device can bypass the submodule in the event of a fault in the submodule. By way of example, the bypass device can bypass the submodule if the submodule-internal power supply fails. The bypass device advantageously allows the communication to and from the other modules of the series circuit to be continued even in the event of a fault of one submodule. This significantly improves the availability of the modular multilevel converter.

The modular multilevel converter may also be designed such that the bypass device at least intermittently optically connects the optical communication input of the submodule to the optical communication output of the sub module.

The modular multilevel converter may also be designed such that the bypass device has an optical mirror. This optical mirror advantageously works even without auxiliary electric power, which means that the bypass device remains operational even in the event of an electrical fault in the sub module.

The modular multilevel converter may be designed such that the adjacent submodules of the series circuit are optically connected by means of an optical fiber and/or the first submodule of the series circuit and the last submodule of the series circuit are each optically connected to the communication device (allocated to the series circuit) by means of an optical fiber. The optical fibers achieve electrical potential isolation between the submodules and/or between the submodules and the communication device.

The modular multilevel converter may also be designed such that the modular multilevel converter has a (central) control device for the submodules, wherein the control device is connected to the communication device by means of a communication link. This allows message exchange between the control device and the submodules via the communication device. The communication link can have one or more optical fibers.

The modular multilevel converter may also be designed such that each sub module of the series circuit is connected to its adjacent submodule by means of two optical fibers, wherein one of the two optical fibers is a redundant optical fiber. In this variant design of the modular multilevel converter, it is advantageous that the converter is operational even in the event of failure of an optical fiber, because the communication is then effected via the other of the two optical fibers.

The modular multilevel converter may be designed such that the multilevel converter has a plurality of (independent) series circuits and a plurality of (independent) communication devices allocated to the series circuits. This allows the submodules of the multilevel converter to be distributed over multiple series circuits. This firstly prevents too many submodules from being arranged in one series circuit (this would sometimes result in long message delays within the series circuit). Secondly, the effect advantageously achieved thereby is that, in the event of failure of one series circuit, the other series circuits can continue to operate independently of the failed series circuit.

The modular multilevel converter may also be designed such that the multilevel converter has a plurality of (independent) ring structures (which each have a series circuit and a communication device). This variant of the multilevel converter has the same kind of advantages as the aforementioned variant.

The disclosure moreover relates to a method for transmitting a message between a communication device and submodules of a modular multilevel converter, wherein each of the submodules has at least two electronic (in particular power electronic) switching elements, an electrical energy store, two electrical connections, an optical communication input and an optical communication output, and wherein the submodules are connected by means of their communication input and their communication output (in terms of communication) to form a series circuit, wherein the method involves
- the message being transmitted from the communication device to an optical communication input of a first submodule of the series circuit by means of a first optical fiber,
- the message then being transmitted from an optical communication output of the first submodule to an optical communication input of a second submodule of the series circuit by means of a second optical fiber, and
- the message being transmitted to the further submodules of the series circuit in succession (in each case by means of further optical fibers) until the message reaches the last submodule of the series circuit. This method advantageously allows the message to be transmitted from the communication device to all submodules of the series circuit in succession (in steps). This merely requires the individual submodules of the series circuit to have optical fibers between them, the length of which is approximately consistent with the distance between the individual submodules. Since the submodules are arranged relatively close to one another as a rule, this allows the transmission of the messages to and from the submodules to be realized using relatively short optical fiber lengths.

The method may be designed such that the message is then transmitted from an optical communication output of the last submodule (of the series circuit) to the communication device. This variant of the method also allows the telegram message to be transmitted back to the communication device after passing through the series circuit.

The method may also be designed such that each submodule of the series circuit has an (in particular explicit) allocated address, the message is provided with the address of a submodule of the series circuit, this one submodule takes this address as a basis for executing an instruction contained in the message (whereas the other submodules of the series circuit ignore the instruction). This variant of the method allows precisely one submodule of the series circuit to respond with the message, the message reaching all submodules of the series circuit in succession.

The method may be designed such that this one submodule of the series circuit writes data into the message (whereas the other submodules of the series circuit forward the message without alteration). This variant of the method allows the addressed submodule to transmit data to the communication device.

The method can proceed such that multiple messages (in particular addressed to different submodules) are transmitted (in the series circuit) in succession in separate time slots. This advantageously allows a time-division multiplexing message transmission method to be implemented, in particular what is known as an address-division multiplexing transmission method.

The cited embodiments of the method also have the same kind of advantages as specified above in connection with the modular multilevel converter.

BRIEF DESCRIPTION OF THE SEVERAL VIEWS OF THE DRAWING

The invention is explained in more detail below on the basis of exemplary embodiments. In this case, the same reference signs refer to elements that are the same or have the same effect. In this regard.

DESCRIPTION OF THE INVENTION

Figure 1:
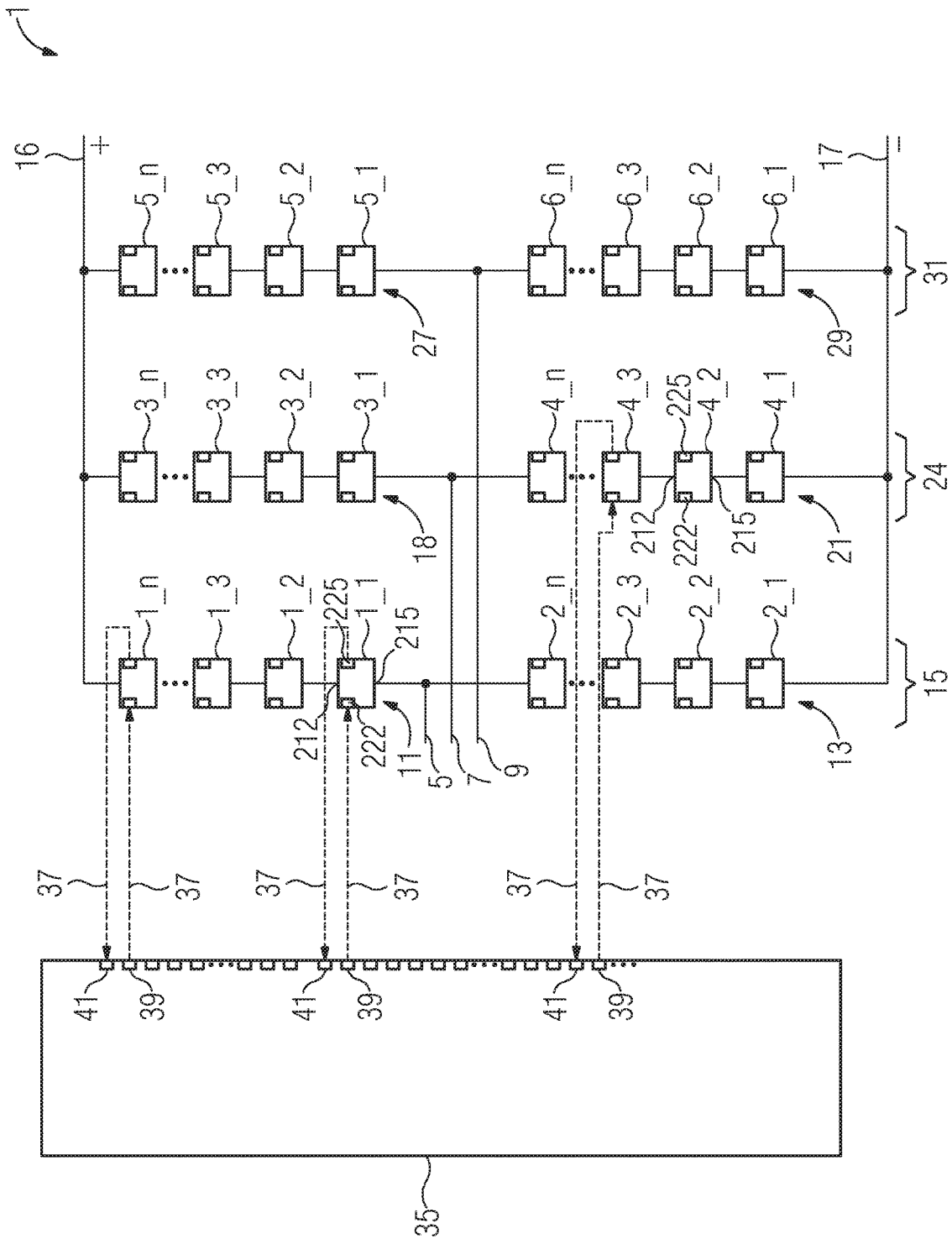
FIG. 1 depicts an exemplary embodiment of a modular multilevel converter.

FIG. 1 depicts a converter 1 in the form of a modular multilevel converter 1 (MMC). This multilevel converter 1 has a first AC voltage connection 5, a second AC voltage connection 7 and a third AC voltage connection 9. The first AC voltage connection 5 is electrically connected to a first phase module branch 11 and a second phase module branch 13. The first phase module branch 11 and the second phase module branch 13 form a first phase module 15 of the converter 1. That end of the first phase module branch 11 that is remote from the first AC voltage connection 5 is electrically connected to a first DC voltage connection 16; that end of the second phase module branch 13 that is remote from the first AC voltage connection 5 is electrically connected to a second DC voltage connection 17. The first DC voltage connection 16 is a positive DC voltage connection; the second DC voltage connection 17 is a negative DC voltage connection.

The second AC voltage connection 7 is electrically connected to one end of a third phase module branch 18 and to one end of a fourth phase module branch 21. The third phase module branch 18 and the fourth phase module branch 21 form a second phase module 24. The third AC voltage connection 9 is electrically connected to one end of a fifth phase module branch 27 and to one end of a sixth phase module branch 29. The fifth phase module branch 27 and the sixth phase module branch 29 form a third phase module 31.

That end of the third phase module branch 18 that is remote from the second AC voltage connection 7 and that end of the fifth phase module branch 27 that is remote from the third AC voltage connection 9 are electrically connected to the first DC voltage connection 16. That end of the fourth phase module branch 21 that is remote from the second AC voltage connection 7 and that end of the sixth phase module branch 29 that is remote from the third AC voltage connection 9 are electrically connected to the second DC voltage connection 17.

Each phase module branch has a plurality of submodules (1_1, 1_2, 1_3, . . . 1_n; 2_1 . . . 2_n; etc.) electrically connected in series (by means of their electrical connections). In the exemplary embodiment of FIG. 1, each phase module branch has n submodules. The number of submodules electrically connected in series (by means of their electrical connections) may be very different, there are at least two submodules that are connected in series, but there may also be 50 or 100 submodules, for example, electrically connected in series. In the exemplary embodiment, n=36: the first phase module branch thus has 36 submodules 1_1, 1_2, 1_3, . . . 1_36.

The left-hand area of FIG. 1 schematically depicts a control device 35 for the submodules 1_1 to 6_n. This central control device 35 transmits optical messages to the individual submodules. The message transmission between the control device and a submodule is depicted in each case symbolically by a dashed line 37; the direction of the message transmission is symbolized by the arrow head on the dashed lines 37. The control device 35 uses optical outputs 39 to send optical messages to the submodules and receives optical messages from the individual submodules using optical inputs 41. This is depicted using the example of the submodules 1_1, 1_n and 4_3; optical messages are sent to the other submodules and received from these submodules in the same way. According to the depiction of FIG. 1, two optical fibers are thus needed per submodule, which each extend between the submodule and the control device. This is the expensive solution with long optical fiber lengths needed that was described at the outset. By contrast, another solution is described below, for which shorter optical fiber lengths are sufficient.

Figure 2:
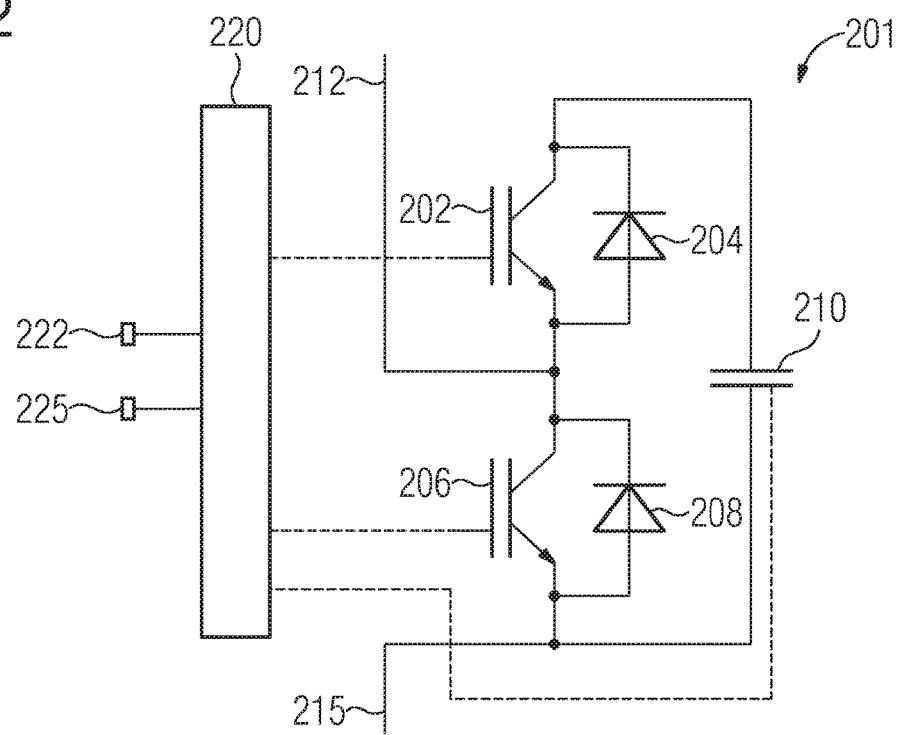
FIG. 2 depicts an exemplary embodiment of a submodule.

FIG. 2 depicts the basic design of a submodule 201 by way of example. This may be the submodule 1_1 of the first phase module branch 11 (or else one of the other submodules depicted in FIG. 1, for example). The submodule is designed as a half bridge module 201. The submodule 201 has a first deactivable semiconductor valve 202 having a first antiparallel-connected diode 204. Additionally, the submodule 201 has a second deactivable semiconductor valve 206 having a second anti parallel-connected diode 208 and also an electrical energy store 210 in the form of a capacitor 210. The first deactivable semiconductor valve 202 is a first electronic switching element 202; the second deactivable semiconductor valve 206 is a second electronic switching element 206. The first deactivable semiconductor valve 202 and the second deactivable semiconductor valve 206 are each designed as an IGBT (insulated-gate bipolar transistor). The first deactivable semiconductor valve 202 is electrically connected in series with the second deactivable semiconductor valve 206. Arranged at the connecting point between the two semiconductor valves is a first electrical submodule connection 212. Arranged on that connection of the second semiconductor valve 206 that is opposite the connecting point is a second electrical submodule connection 215. The second submodule connection 215 is additionally connected to a first connection of the energy store 210; a second connection of the energy store 210 is electrically connected to that connection of the first semiconductor valve 202 that is opposite the connecting point.

The energy store 210 is thus electrically connected in parallel with the series circuit comprising the first semiconductor valve 202 and the second semiconductor valve 206. The effect that can be achieved by appropriate actuation of the first semiconductor valve 202 and the second semiconductor valve 206 by a submodule-internal electronic actuating circuit 220 is that between the first electrical submodule connection 212 and the second electrical submodule connection 215 either the voltage of the energy store 210 is output or no voltage is output (i.e. a zero voltage is output). Interaction of the submodules of the individual phase module branches thus allows the respectively desired output voltage of the converter to be produced. For the purpose of submodule-external communication, the submodule 201 has an optical communication input 222 and an optical communication output 225. The optical communication input 222 and the optical communication output 225 are connected to the actuating circuit 220. The optical communication input 222 and the optical communication output 225 each have an optical fiber connected to them for the purpose of submodule-external communication. Additionally, the actuating circuit 220 can also capture states of the submodule and report them to the central control device 35. In FIG. 2, by way of example, a dashed line is used to indicate that the actuating circuit 220 captures the state of charge of the energy store 210 and can report it to the central control device 35.

The optical communication input 222 of the submodule 201 forwards the optical messages arriving at it to the actuating circuit 220; the actuating circuit 220 outputs (altered or unaltered) optical messages at the optical communication output 225 of the submodule.

Figure 3:
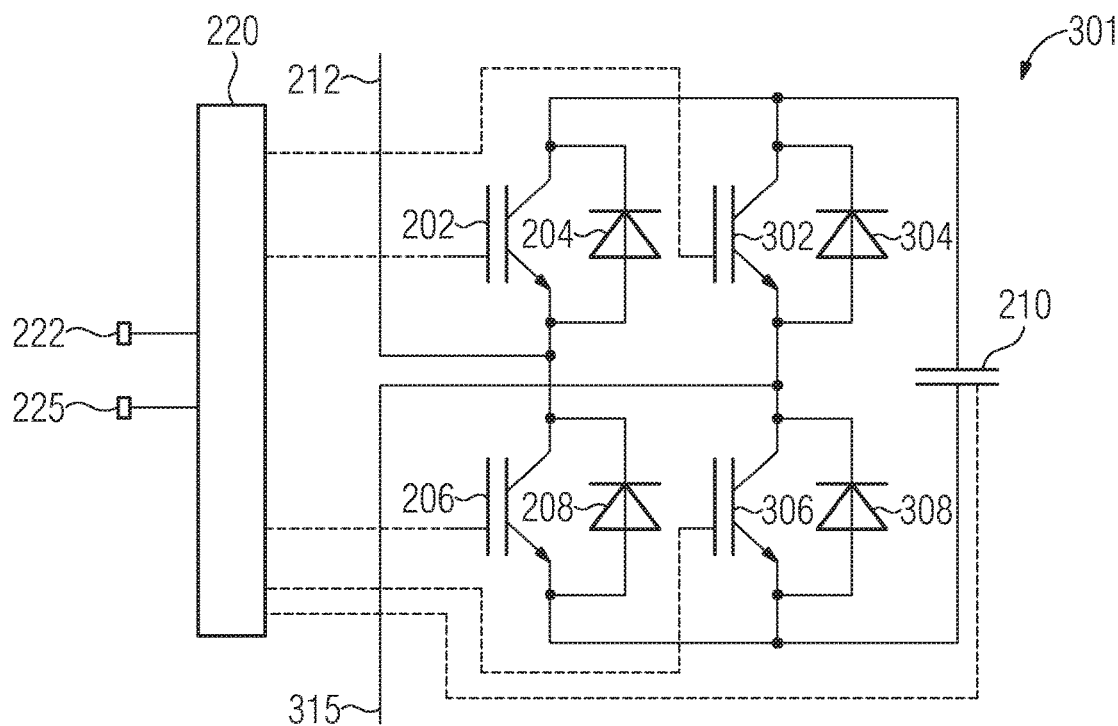
FIG. 3 depicts a further exemplary embodiment of a submodule.

FIG. 3 depicts a further exemplary embodiment of a submodule 301. This submodule 301 may be the submodule 1_n (or else one of the other submodules depicted in FIG. 1) for example. Besides the first semiconductor valve 202, second semiconductor valve 206, first diode 204, second diode 208, energy store 210 and actuating circuit 220 already known from FIG. 2, the submodule 301 depicted in FIG. 3 has a third deactivable semiconductor valve 302 having an antiparallel-connected third diode 304 and a fourth deactivable semiconductor valve 306 having a fourth antiparallel-connected diode 308. The third deactivable semiconductor valve 302 is a third electronic switching element 302; the fourth deactivable semiconductor valve 306 is a fourth electronic switching element 306. The third deactivable semiconductor valve 302 and the fourth deactivable semiconductor valve 306 are each designed as an IGBT. In contrast to the circuit of FIG. 2, the second electrical submodule connection 315 is connected not to the second semiconductor valve 206 but rather to a center point of an electrical series circuit comprising the third semiconductor valve 302 and the fourth semiconductor valve 306.

The sub module 301 of FIG. 3 is what is known as a full bridge module 301. The full bridge module 301 is distinguished in that appropriate actuation of the fourth semiconductor valves between the first electrical submodule connection 212 and the second electrical submodule connection 315 can entail a choice of either the positive voltage of the energy store 210, the negative voltage of the energy store 210 or a voltage having the value zero (zero voltage) being output. Therefore, it is thus possible for the full bridge module 301 to be used to reverse the polarity of the output voltage. The converter 1 can have either only half bridge modules 201, only full bridge modules 301 or else half bridge modules 201 and full bridge modules 301.

Each of the depictions of FIGS. 2 and 3 shows a submodule having the first electrical submodule connection 212 and the second electrical submodule connection 215 or 315. The first electrical submodule connection 212 and the second electrical submodule connection 215, 315 carry large electrical currents of the converter. Additionally, each submodule has the actuating circuit 220, which actuates the switching elements 202, 206, 302 and/or 306, in particular. This actuating circuit 220 communicates with submodule-external units (in this case: with a submodule-external communication device, cf. FIGS. 4 and 5) via the optical communication input 222 and the optical communication output 225 by means of optical fibers in potential-isolation fashion. The interconnection/connection of the optical communication input 222 and the optical communication output 225 of the individual submodules by means of optical fibers is described below.

Figure 4:
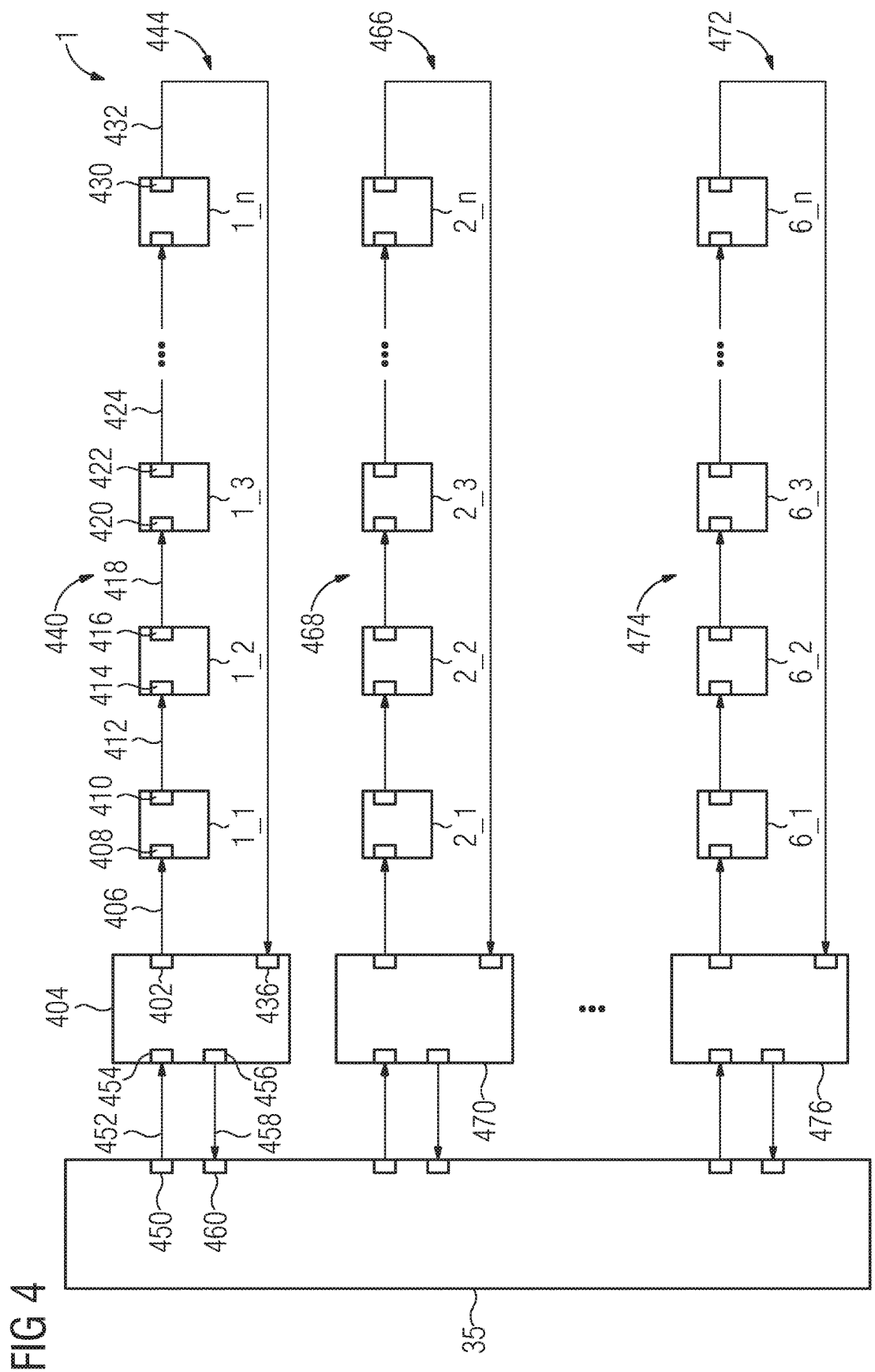
FIG. 4 depicts an exemplary embodiment of a multilevel converter having multiple series circuits comprising submodules.

FIG. 4 depicts only the central control device 35 and, by way of example the submodules of the first phase module branch 11, of the second phase module branch 13 and of the sixth phase module branch 29, of the multilevel converter 1 known from FIG. 1. All further submodules of the multilevel converter 1 are arranged in the same manner as these submodules depicted by way of example.

The top right-hand part of FIG. 4 depicts the submodules 1_1 to 1_n of the first phase module branch 11. In contrast to the depiction of FIG. 1, FIG. 4 does not depict the power electronic connections of the submodules; FIG. 4 merely depicts the optical communication input and the optical communication output of the individual sub modules.

An optical output 402 of a first communication device 404 is optically connected to a first communication input 408 of the submodule 1_1 by means of a first optical fiber 406. An optical communication output 410 of the submodule 1_1 is optically connected to an optical communication input 414 of the submodule 1_2 by means of a second optical fiber 412. An optical communication output 416 of the submodule 1_2 is optically connected to an optical communication input 420 of the submodule 1_3 by means of a third optical fiber 418. An optical communication output 422 of the submodule 1_3 is optically connected to the submodule 1_4 by means of a fourth optical fiber 424, and so on. Finally, an optical communication output 430 of the last submodule 1_n is optically connected to an optical input 436 of the first communication device 404 by means of an optical fiber 432. The optical fiber 432 can also be referred to as a return optical fiber 432.

The n sub modules 1_1 to 1_n form a first series circuit 440. The first series circuit 440 forms a first ring structure 444 of the converter 1 with the first communication device 404.

The first communication device 404 is optically connected to the control device 35 by means of second optical fibers. As such, an optical fiber 452 runs from an optical output 450 of the control device 35 to a further optical input 454 of the first communication device 404. This optical fiber 452 is used to transmit messages from the control device 35 to the first communication device 404 by optical means. A further optical fiber 458 runs from a further optical output 456 of the first communication device 404 to an optical input 460 of the control device 35. Unlike what is depicted in FIG. 4, the optical fibers 452, 458 between the control device 35 and the first communication device 404 may be very long: they may be longer by a multiple than the optical fibers in the first ring structure 444, for example.

In the first ring structure 444, the first communication device 404 is a master 404; the individual submodules 1_1 . . . 1_n are each slaves. The first communication device 404 operating as a master thus supervises the message transmission to the individual submodules 1_1 to 1_n operating as slaves. This means that all of the message transmissions within the first ring structure 444 are initiated by the first communication device 404.

The modular multilevel converter 1 additionally has a second ring structure 466, which for its part has a second series circuit 468 and a second communication device 470. The second series circuit 468 comprises the series-connected sub modules 2_1 to 2_n.

Similarly, the modular multilevel converter 1 has further ring structures, of which the m-th ring structure 472 is depicted in FIG. 4. In the exemplary embodiment, this m-th ring structure 472 has an m-th series circuit 474 and an m-th communication device 476. The m-th series circuit 474 for its part has the submodules 6_1 to 6_n. The multilevel converter 1 thus has a plurality of independent series circuits 440, 468 to 474 and consequently also a plurality of independent ring structures 444, 466 to 472.

Figure 5:
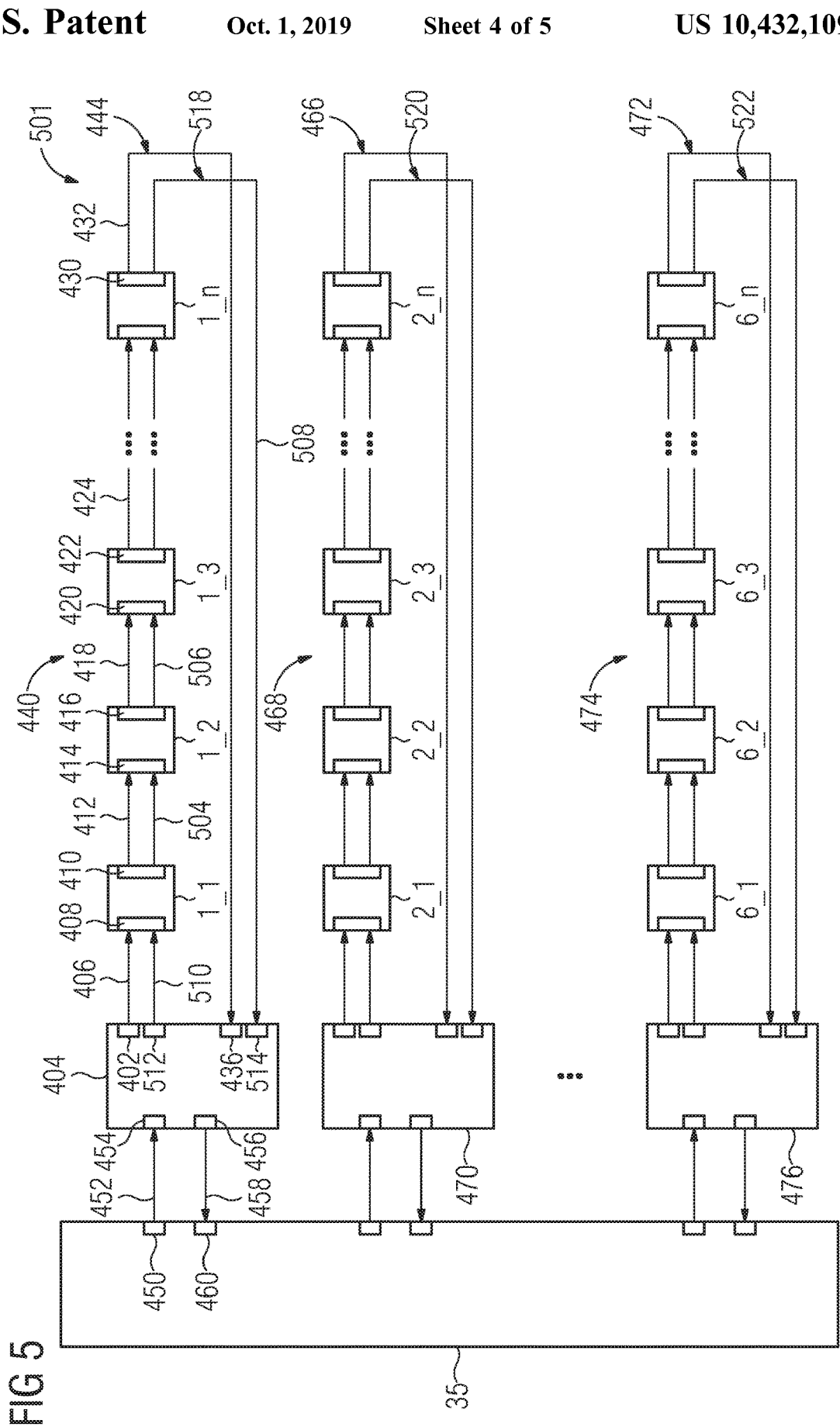
FIG. 5 depicts an exemplary embodiment of a multilevel converter having redundant optical fibers.

FIG. 5 depicts a further exemplary embodiment of a modular multilevel converter 501. In contrast to the exemplary embodiment of FIG. 4, each submodule of the series circuit in FIG. 5 is optically connected to its adjacent submodule by means of two optical fibers. In this case, one of the two optical fibers is a redundant optical fiber. As such, in the first ring structure 444, for example, the submodule 1_1 is not only optically connected to the submodule 1_2 via the second optical fiber 412, but rather these two submodules are additionally optically connected to one another via an optical fiber 504. In this case, the optical fiber 504 is a redundant optical fiber.

Similarly, the sub module 1_2 is optically connected to the submodule 1_3 not only by means of the third optical fiber 418 but also by means of an optical fiber 506. In the same manner, the n-th sub module 1_n is also optically connected to the first communication device 404 not only by means of the optical fiber 432 (return optical fiber 432) but also by means of an optical fiber 508 (additional return optical fiber 508). Similarly, the first communication device 404 is also optically connected to the submodule 1_1 not only via the first optical fiber 406 but also via an additional optical fiber 510. In this case, the optical fibers 504, 506, 508 and 510 are redundant, i.e. they are not required for the message transmission within the first ring structure 444 during normal operation. Should one of the optical fibers 406, 412, 418, 424 or 432 fail, however, then its task is undertaken by the redundant optical fiber 504, 506, 508 or 510 optically connected in parallel. In this case, the direction of the message transmission (symbolized by the arrow heads on the optical fibers) in the case of the redundant additional optical fibers may also be the inverse of that for the nonredundant optical fibers. The first communication device 404 has an additional optical output 512 and an additional optical input 514 for the redundant optical fibers. Alternatively, it is also possible for two communication devices operated in parallel to be used, in order to provide sufficient optical outputs and inputs.

The redundant optical fiber means that a first redundant ring structure 518 exists that is redundant in respect of the first ring structure 444. In the same manner, a second redundant ring structure 520 exists that is redundant in respect of the second ring structure 466. This is repeated for the other ring structures of the converter; finally, there is also an m-th redundant ring structure 522 that is redundant in respect of the m-th ring structure 472.

Figure 6:
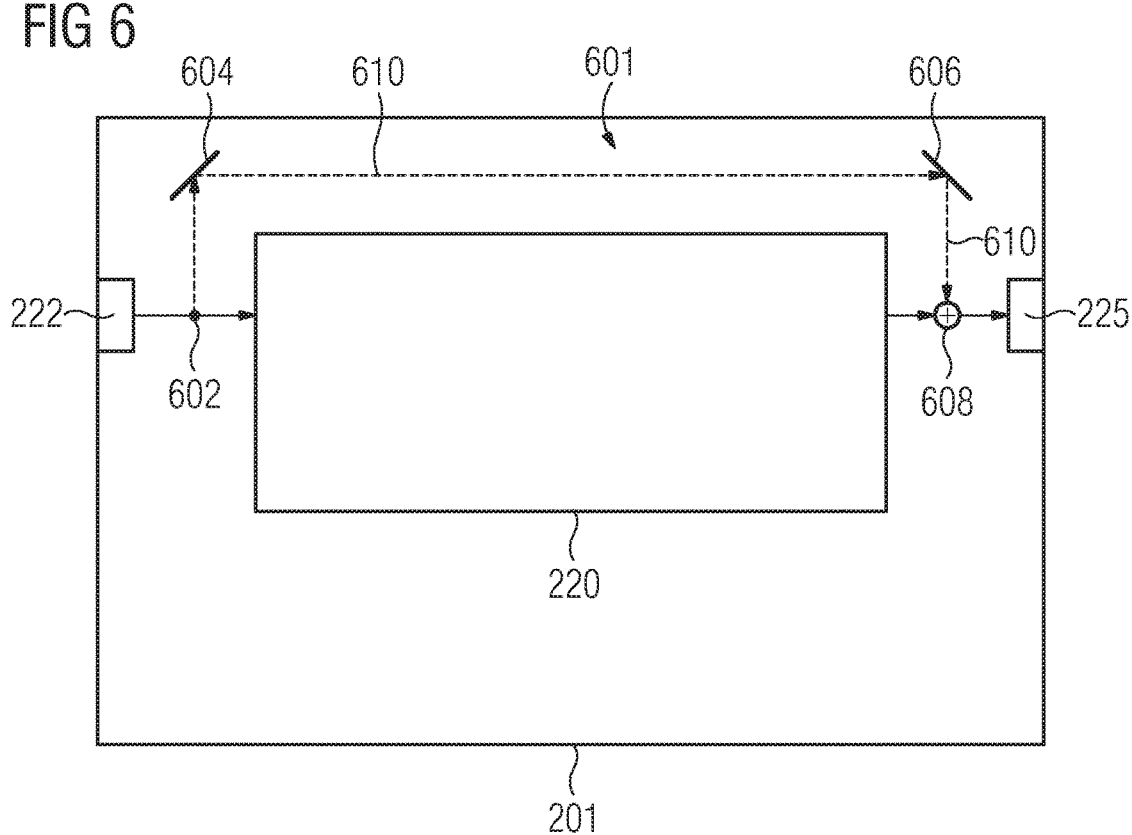
FIG. 6 depicts an exemplary embodiment of a submodule having a bypass device.

FIG. 6 depicts an optional exemplary detail of the submodule 201 of FIG. 2: a bypass device 601. The submodule 301 of FIG. 3 can likewise have such a bypass device.

The optical bypass device 601 of the submodule 201 is an optical bypass 601. The bypass device 601 has an optical distributor 602, a first optical mirror 604, a second optical mirror 606 and an optical collection point 608 (optical addition point 608).

At the optical communication input 222, a portion of the incident light is branched off at the optical distributor 602 and (with the bypass device activated) routed to the optical collection point 608 via the first optical mirror 604 and the second optical mirror 606. At the optical collection point 608, the light of the reflected beam of light 610 is supplied to the optical communication output 225.

The first optical mirror 604 is in the position depicted in FIG. 6 only in the event of failure of (fault in) the submodule (for example in the event of failure of the submodule-internal power supply) and routes the reflected beam of light 610 to the second mirror 606 only then. The bypass device is thus activated only in the event of failure of the submodule. When the submodule is operational (for example when the submodule-internal power supply is working), the mirror is in a different orientation (for example as a result of an electromagnet acting against the force of a spring), in which it does not forward the branched-off light to the second optical mirror 606: the bypass device 601 is then deactivated.

In this manner, the optical message transmission via the submodule 201 can continue to take place even in the event of failure/fault of/in the submodule (for example in the event of failure of the submodule-internal power supply); the optical message transmission in the ring structure (containing the submodule 201) is not interrupted by the failure of the sub module.

The optical distributor 602, the first optical mirror 604, the second optical mirror 606 and the optical collection point 608 do not need additional auxiliary electric power with the bypass device 601 activated. This bypass device 601 is used for (at least intermittently) optically bypassing the submodule 201, in other words the bypass device 601 at least intermittently connects the optical communication input 222 of the submodule to the optical communication output 225 of the submodule. All submodules of the multilevel converter can have such a bypass device 601.

Figure 7:
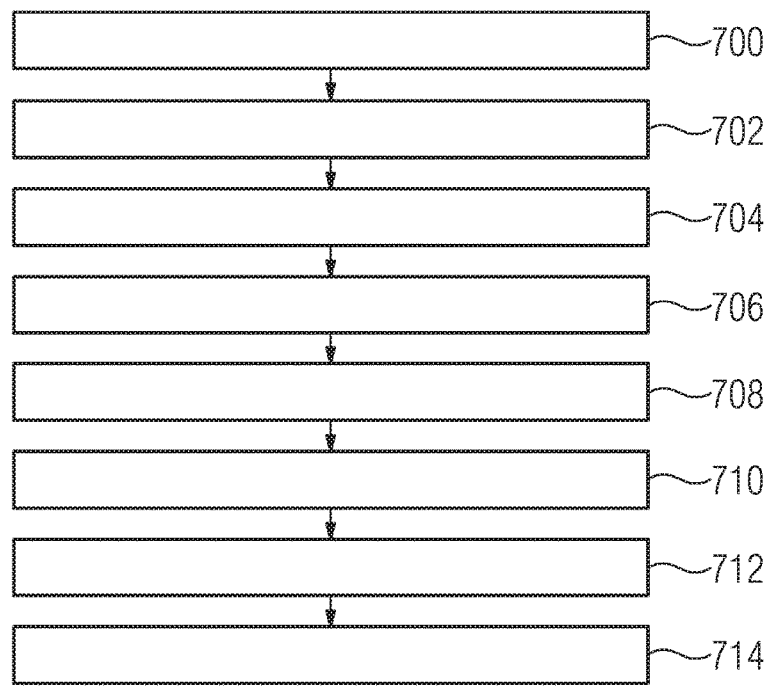
FIG. 7 depicts an exemplary method cycle.

FIG. 7 depicts an exemplary method cycle taking place for the multilevel converter. This method cycle relates to the exemplary embodiment of FIG. 4.

Method step 700 (preparatory method step, needs to be performed only once, i.e. does not need to be performed again for each method cycle): each submodule 1_1, 1_2 to 6_n is allocated a separate, in particular a unique, address. By way of example, such an address is an individual string of digits and/or alphanumeric characters, for example a sub module number.

Method step 702:

The control device 35 sends a message (which can also be referred to as a telegram or telegram message) to the first communication device 404 via the optical fiber 452. This message is directed at the submodule 1_2 and therefore contains the address of the submodule 1_2. Moreover, the message contains the instruction to the submodule 1_2 to close the switching element 202.

Method step 704:

The first communication device 404 receives the message and sends it at its optical output 402 to the first ring structure 444. The message reaches the optical communication input 408 of the submodule 1_1 via the first optical fiber 406.

Method step 706:

The submodule 1_1 detects from the address that the message contains for the submodule 1_2 that this message is not intended for the submodule 1_1. Thus, the submodule 1_1 forwards the message to its optical communication output 410 without alteration and ignores the instruction that the message contains for the submodule 1_2. The message then reaches the submodule 1_2 via the second optical fiber 412.

Method step 708:

The submodule 1_2 detects from the address that the message contains for the submodule 1_2 that the message is intended for it and evaluates the message. In this case, the submodule 1_2 executes the instruction that the message contains and closes the switching element 202.

Method step 710:

The submodule 1_2 writes data conferring the successful execution of the instruction (that is to say in this case, by way of example: switching element 202 successfully closed) to the message. The submodule 1_2 then forwards the message to the submodule 1_3 via the third optical fiber 418.

Method step 712:

The submodule 1_3 ignores the instruction that the message contains, because the message does not contain the address of the submodule 1_3, but rather contains the address of the submodule 1_2. This process is repeated until the message reaches the first communication device 404 via the return optical fiber 432.

Method step 714:

The first communication device 404 then forwards the message to the control device 35 via the further optical fiber 458.

Messages addressed to different submodules are transmitted in succession (that is to say in separate time slots) by the first ring structure 444. The data transmission is thus a time-division multiplexing data transmission, in particular an address-division multiplexing data transmission.

In the case of the multilevel converter described and the method described, it is particularly advantageous that the message can be forwarded within the ring structure directly from one submodule to the adjacent submodule each time. This allows in particular short connecting paths between the submodules and hence short required optical fiber lengths to be produced. This lowers the costs for the modular multilevel converter and for performing the method considerably (in comparison with the circuit shown in FIG. 1, in which the control device 35 sends and receives the message to and from each individual submodule by means of two individual optical fibers each time).

A multilevel converter and a method have been described in which coded telegram streaming of messages (telegram messages) from a master to multiple submodules takes place, the submodules and the master forming a serial ring structure. In such a ring structure, there may be 24 or 36 submodules arranged, for example; other numbers of submodules are also possible in such a ring structure, however. The communication device 404 operating as a master continually sends messages via all submodules of the serial ring structure in this case.

The messages each contain at least one submodule address, a read area and a write area. The read area can contain at least one instruction for the addressed submodule, and the addressed submodule can write data to the write area. The addressed submodule thus reads the information directed at it from the data transmission occurring in the ring channel and writes its data back to the data transmission of the ring channel. After the message has passed through all submodules, the message returns with the data of the addressed submodules to the master, that is to say to the first communication device 404. This method and this multilevel converter allow a considerable reduction in the lengths of the required optical fibers. Reductions in the order of magnitude of up to 90% are conceivable.

In the optional variant embodiment of FIG. 5, the serial ring structure is doubled, and the communication device 404 is provided with two optical outputs and two optical inputs (alternatively, it is also possible for two communication devices 404 to be used as two masters). The redundant ring structure means that the message transmission can continue without disturbance even in the event of a fault (e.g. in the event of an optical fiber fracture). In this variant embodiment too, a reduction of the required optical fiber lengths of up to 80% is still conceivable.

The invention claimed is:

1. A modular multilevel converter, comprising:
   sub modules each having at least two electronic switching elements, an electrical energy storage device, two electrical connections, an optical communication input and an optical communication output;
   wherein a plurality of said sub modules are connected by way of said communication input and said communication output thereof to form a series circuit, and wherein each sub module of the series circuit has an assigned address;
   wherein an optical communication input of a first sub module of the series circuit receives a message from a communication device, the message carrying the address of a given sub module of the series circuit; and
   the given sub module is configured to take the address as a basis for executing an instruction contained in the message.

2. The modular multilevel converter according to claim 1, wherein a first said sub module of said series circuit and a last said sub module of said series circuit are each connected to a communication device that is allocated to said series circuit.

3. The modular multilevel converter according to claim 2, wherein said sub modules of said series circuit and said communication device allocated to said series circuit are connected to form a ring structure.

4. The modular multilevel converter according to claim 3, wherein said ring structure is one of a plurality of ring structures.

5. The modular multilevel converter according to claim 2, wherein said communication device is a master and each of said sub modules of said series circuit is a slave.

6. The modular multilevel converter according to claim 2, which comprises a control device for said sub modules, wherein said control device is connected to said communication device by way of a communication link.

7. The modular multilevel converter according to claim 2, wherein said series circuit is one of a plurality of series circuits and said communication device is one of a plurality of communication devices allocated to said series circuits.

8. The modular multilevel converter according to claim 1, wherein at least one of said sub modules includes an optical bypass device.

9. The modular multilevel converter according to claim 8, wherein said bypass device is configured to at least intermittently optically connect said optical communication input of said sub module to said optical communication output of said sub module.

10. The modular multilevel converter according to claim 8, wherein said bypass device includes an optical mirror.

11. The modular multilevel converter according to claim 1, wherein:
    adjacent said sub modules of said series circuit are optically connected by way of an optical fiber; and/or
    a first said sub module of said series circuit and a last said sub module of said series circuit are each optically connected to said communication device by way of an optical fiber.

12. The modular multilevel converter according to claim 1, wherein each said sub module of said series circuit is connected to an adjacent said sub module by way of two optical fibers, wherein one of said two optical fibers is a redundant optical fiber.

13. A method for transmitting a message between a communication device and sub modules of a modular multilevel converter, wherein each of the sub modules has at least two electronic switching elements, an electrical energy storage device, two electrical connections, an optical communication input and an optical communication output, and wherein the sub modules are connected by way of their communication input and their communication output to form a series circuit, the series circuit having a first sub module, a second sub module, and further sub modules, and each sub module of the series circuit has an assigned address, the method comprising:
    transmitting the message from the communication device to an optical communication input of the first sub module of the series circuit through a first optical fiber;
    then transmitting the message from an optical communication output of the first sub module to an optical communication input of the second sub module of the series circuit through a second optical fiber; and
    transmitting the message to the further sub modules of the series circuit in succession until the message reaches a last sub module of the series circuit;
    wherein the message is provided with the address of a given sub module of the series circuit; and
    the given sub module takes the address as a basis for executing an instruction contained in the message.

14. The method according to claim 13, which comprises subsequently transmitting the message from an optical communication output of the last sub module to the communication device.

15. The method according to claim 13, wherein the given sub module of the series circuit writes data into the message.

16. The method according to claim 13, which comprises transmitting multiple messages successively in separate time slots.

* * * * *